US008769257B2

(12) United States Patent
Sood (10) Patent No.: US 8,769,257 B2
(45) Date of Patent: Jul. 1, 2014

(54) METHOD AND APPARATUS FOR EXTENDING TRANSPORT LAYER SECURITY PROTOCOL FOR POWER-EFFICIENT WIRELESS SECURITY PROCESSING

(75) Inventor: Kapil Sood, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1007 days.

(21) Appl. No.: 12/343,119

(22) Filed: Dec. 23, 2008

(65) Prior Publication Data

US 2010/0161959 A1 Jun. 24, 2010

(51) Int. Cl.
*H04L 29/06* (2006.01)
(52) U.S. Cl.
USPC .......................................... 713/151; 713/150
(58) Field of Classification Search
USPC ................................................ 713/150, 151
See application file for complete search history.

(56) References Cited

U.S. PATENT DOCUMENTS

| | | | | |
|---|---|---|---|---|
| 7,920,549 | B2* | 4/2011 | Alt et al. ........................ | 370/352 |
| 2004/0098588 | A1* | 5/2004 | Ohba et al. .................... | 713/169 |
| 2005/0165953 | A1* | 7/2005 | Oba et al. ...................... | 709/238 |
| 2007/0019622 | A1* | 1/2007 | Alt et al. ........................ | 370/352 |
| 2007/0022289 | A1* | 1/2007 | Alt et al. ........................ | 713/168 |
| 2007/0043940 | A1* | 2/2007 | Gustave et al. ................ | 713/150 |
| 2007/0206537 | A1* | 9/2007 | Cam-Winget et al. ........ | 370/331 |
| 2007/0258414 | A1* | 11/2007 | Cheng et al. ................... | 370/338 |
| 2008/0101598 | A1* | 5/2008 | Dillaway ....................... | 380/44 |
| 2008/0183883 | A1* | 7/2008 | Mauro et al. .................. | 709/230 |
| 2008/0189784 | A1* | 8/2008 | Mangione-Smith et al. ... | 726/23 |
| 2008/0253395 | A1* | 10/2008 | Pandya .......................... | 370/469 |
| 2010/0161958 | A1* | 6/2010 | Cho et al. | |
| 2011/0264915 | A1* | 10/2011 | Cam-Winget et al. ........ | 713/171 |

FOREIGN PATENT DOCUMENTS

| | | |
|---|---|---|
| JP | 2004-201288 | 7/2004 |
| JP | 2006140958 A | 6/2006 |
| JP | 2007116509 A | 5/2007 |
| JP | 2007520797 A | 7/2007 |
| JP | 2008205632 A | 9/2008 |
| JP | 2008228089 A | 9/2008 |

OTHER PUBLICATIONS

"An FPGA-based AES-CCM Crypto Core for IEEE 802.11i Architecture" (Sep. 2007) by Arshad Aziz and Nassar Ikram; International Journal of Network Security, vol. 5, No. 2, pp. 224-232 of (9 pages total); originally downloaded from http://ijns.femto.com.tw/contents/ijns-v5-n2/ijns-2007-v5-n2-p224-232.pdf.*

(Continued)

*Primary Examiner* — Chau Le
*Assistant Examiner* — Don Zhao
(74) *Attorney, Agent, or Firm* — Pillsbury Winthrop Shaw Pittman LLP (57) ABSTRACT

Embodiments of the invention relate to apparatus, system and method for security extensions to the IETF Transport Layer Protocol (TLS) and IPsec standards that enable wireless devices to perform power-efficient and streamlined security packet processing. Embodiments of the invention enable a processor to use its existing cryptographic processing engines (e.g., AES-CCM) to perform TLS and IPsec security processing. Packets processed for WLAN and TLS security are processed pipelined, eliminating the multi-loop processing that currently exists, and decreases power consumed to process each packet. In addition, the host/chipset complex is woken up after all security processing has been done in the WNIC.

23 Claims, 4 Drawing Sheets

(56) References Cited

OTHER PUBLICATIONS

NPL "How TLS protocol works" (Jan. 22, 2007) by Paul Szymanski; 3 pages; converted to PDF originally from http://www.networkworld.com/news/2007/011807-tls3.html.*

Fan Yang, An improved security scheme in WMAN based on IEEE standard 802.16, Wireless Communications, Networking and Mobile Computing, 2005, p. 1145-1148, vol. 2, Piscataway, NJ.

Zoltan Faigl, IPsec, IKEv2 and their use in Mobile IPv6, Anemone, 2007, p. 1-42.

Housley Vigil Security R, Using Advanced 1-17 Encryption Standard (AES) CCM Mode with IPsec Encapsulating Security Payload (ESP); rfc4309.txt, IETF Standard, Internet Engineering Task Force, IETF, CH, 2005, section 1 and 3.

Simon B. Aboba, The EAP-TLS Authentication Protocol, IEFT Standard, Internet Engineering Task Force, 2008, Section 2 and subsections.

Helion "The Helion basic guide to AES encription in hardware" Version : V1.1.1 2002-2006, Helion Technology Limited, p. 1-6.

European Search Report in related application No. 09180017.7-2413 dated Apr. 29, 2010.

Japanese Office Action with English Translation issued in corresponding Japanese Application No. 2009-286993, dated May 8, 2012, 9 pages.

Hasegawa, et al. "Finding and Negotiating Service Using MIRAI Signaling" IEICE General Conference Papers (2005), Communication 2, The Institute of Electronics, Information and Communication Engineers (IEICE, Mar. 7, 2005, S-23.

Japanese Office Action, Japanese Patent Application No. 2009-286993, mail date Jun. 11, 2013, total of 7 pages.

European Patent Office, Substantive Examination Report, Application No. 09180017.7, mail date Jan. 10, 2014, total of 4 pages.

* cited by examiner

METHOD AND APPARATUS FOR EXTENDING TRANSPORT LAYER SECURITY PROTOCOL FOR POWER-EFFICIENT WIRELESS SECURITY PROCESSING

RELATED APPLICATION

None.

FIELD OF INVENTION

Embodiments of the invention relate to apparatus, system and method for improved encryption processing in wireless communication devices.

BACKGROUND

Wireless access points (AP) such as WiFi hotspots provide pubic WLAN access in many locations such as airports, hotels, coffee shops, etc., providing networking access (e.g., internet access) to wireless clients. The wireless client may implement security measures such as encryption, which are used to prevent problems such as unauthorized access, eavesdropping, or spoofing of authorized users. The security measures may be implemented as security protocols at a networking layer, and/or security processing at a physical layer. The wireless client device may have more than one processor performing encryption processing.

The embodiments of the invention relate to improved methodology of implementing security processing within a wireless client.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

The following glossary defines terms used herein unless a different meaning is assigned within the context of usage. The Authoritative Dictionary of IEEE Standards Terms, Seventh Edition, should be referenced for terms not otherwise defined herein.

| Acronym | Definition |
| --- | --- |
| AES | Advanced Encryption Standard |
| AES-CCM | AES/Cipher Block Chaining-Message Authentication Code |
| AES-CTR | AES Counter |
| AES-GCM | AES - Galois Counter Mode |
| AP | Access Point |
| BSS | Basic Service Set |
| CBC-MAC | Cipher Block Chaining - Message Authentication Code |
| DSA | Digital Signature Algorithm |
| IEEE | Institute of Electrical and Electronic Engineers |
| IETF | Internet Engineering Task Force |
| IPsec | Internet Protocol Security |
| MIC | Message Integrity Code |
| MID | Mobile Internet Device |
| PTK | Pairwise Transient Key |
| RSA | Rivest Shamir Adleman |
| RSNA | Robust Security Network Association |
| SA | Security Association |
| SHA | Secure Hash Algorithm |
| SSL | Secure Socket Layer |
| TCP/IP | Transmission Control Protocol/Internet Protocol |
| TLS | Transport Layer Security |
| UMPC | Ultra-Mobile Personal Computer |
| WNIC | Wireless Network Interface Card |

WiFi refers to wireless communication technology usable by both mobile and fixed communication devices. Mobile wireless technology may be specified in IEEE Standard 802.11, "Wireless LAN Medium Access Control (MAC) and Physical Layer (PHY) specifications" and amendments thereto (hereinafter "IEEE 802.11" or "802.11"). The purpose of IEEE 802.11 is to provide wireless connectivity to automatic machinery, equipment, or stations that require rapid deployment, which may be portable or hand-held, or which may be mounted on moving vehicles within a local area. This standard also offers regulatory bodies a means of standardizing access to one or more frequency bands for the purpose of local area communication.

Security mechanisms for wireless networks may be specified in IEEE 802.11i, an amendment to the original IEEE 802.11 standard, now incorporated into the published IEEE 802.11-2007 standard.

IEEE 802.11r-2008, or fast Basic Service Set (BSS) transition, is an amendment to the IEEE 802.11 standard to permit continuous connectivity aboard wireless devices in motion, with fast and secure handoffs from one base station to another managed in a seamless manner. IEEE 802.11r redefines the security key negotiation protocol, allowing both the negotiation and requests for wireless resources.

IEEE 802.11 Amendment 7, "Interworking with External Networks" may be referred to as "IEEE 802.11u" or "802.11u." IEEE 802.11u specifies enhancements to 802.11 that support WLAN Interworking with External Networks, facilitating higher layer functionalities. IEEE 802.11u improves information transfer from external networks, aiding network selection, and enabling emergency services.

Wireless technology used by fixed wireless communication devices may be specified in IEEE Standard 802.16, "Air Interface for Fixed Broadband Wireless Systems" and amendments thereto (hereinafter "IEEE 802.16" or "802.16"). It will be understood as used herein that "wireless," "wireless technology," and similar terms may refer to either 802.11 or 802.16 unless expressly limited otherwise.

The purpose of IEEE 802.16 is to specify the air interface of fixed broadband wireless access (BWA) systems supporting multimedia services. The medium access control layer (MAC) supports a primarily point-to-multipoint architecture, with an optional mesh topology. The MAC is structured to support multiple physical layer (PHY) specifications, each suited to a particular operational environment. For operational frequencies from 10-66 GHz, the PHY is based on single-carrier modulation. For frequencies below 11 GHz, where propagation without a direct line of sight must be accommodated, three alternatives are provided: orthogonal frequency-division multiplexing (i.e., WirelessMAN-OFDM or "OFDM"); orthogonal frequency-division multiple access (i.e., WirelessMAN-OFDMA or "OFDMA"); and orthogonal frequency-division using single-carrier modulation (i.e., WirelessMAN-SCa or "single-carrier modulation").

IEEE 802.16e provides enhancements to IEEE Std 802.16 to support subscriber stations moving at vehicular speeds and thereby specifies a system for combined fixed and mobile broadband wireless access. Fixed IEEE 802.16 subscriber capabilities are not compromised.

IEEE 802.16m is a draft amendment to IEEE 802.16, providing an advanced air interface meeting the cellular layer requirements of advanced next generation mobile networks, with continuing support for legacy wireless equipment.

WiFi hotspots provide pubic WLAN access in many locations such as airports, hotels, coffee shops, etc. and may provide various services such as internet access, streaming video (e.g., IP TV), IMS, and online games. There is a need for security in order to prevent problems such as eavesdropping, spoofing, unauthorized access, etc. Security may be provided at more than one layer of a networking model.

A networkable wireless device includes a wireless network interface card (WNIC). Conventional packet processing on wireless devices performs wireless security processing on the WNIC, and the TLS (or IPSec) packet is processed on the main processor of the wireless device, then delivered to a different cryptographic processor within the wireless device for security processing, then sent back to the main processor of the wireless device for further delivery to an application (e.g., a browser).

IETF TLS/SSL security protocols use security processing algorithms at a higher layer that are distinct from the protocols used for wireless security processing at lower layers, e.g., as specified in IEEE 802.11i, 802.11r, 802.16e, and 802.16m. While this is adequate for coarse grained client processing, for instance for transport-layer security in laptop computers, applying existing security methods from the TLS layer to communication packets processed at lower layers is disadvantageous because such methods increase the packet security processing overhead. Processing each packet on a wireless device using TLS/SSL security protocols would include executing a complex, multi-loop path between a host, to/from a processor implementing cryptographic functions, to/from a separate WNIC processor. Processors, as used herein (unless a different meaning is clearly indicated by the context of usage), may include either separate processing chips implementing processing functions, or separate independent processing cores physically on the same chip.

The increase in security processing steps arises because the TLS standard does not allow clients to negotiate wireless layer-2 (i.e., networking-layer) security ciphers. Instead, transport layer security processing is performed via software algorithms running on a processor (e.g. host processor on a laptop) performing the cryptographic functions. Wireless packet and security processing typically is performed on a separate wireless processor. This division of processing tasks degrades the overall power consumption of the wireless device because signals, including data packet and state, have to be driven from one chipset to another chipset. Furthermore, it may not be possible to place some of these processors in any extended period of reduced power consumption while the security processing is taking place.

For low-power, ultramobile devices such as Mobile Internet Devices (MID)/Ultra-Mobile PC (UMPC) devices, the power consumption and latency needed to process each communication packet increases significantly, arising from the increase in security processing steps. This in turn causes an undesirable decrease in battery life and increase in heat to be dissipated.

In order to overcome the aforementioned problems, embodiments of the present invention propose security extensions to the IETF TLS or IETF IPsec standards, which enable the Mobile Internet Devices (MID) architectures to perform power-efficient and streamlined security packet processing. Transport Layer Security protocol is the ubiquitous application security protocol of the internet, used in bank transactions, intranet security, web services, etc. Embodiments of the invention have a further advantage of reducing power consumption of the wireless device by placing at least a portion of the wireless device in a lower power consumption mode during at least a portion of the time used to process security. In particular, a host/chipset complex may be placed in such a reduced-power state, then woken up to a higher-power state after all security processing has been done in the WNIC.

In particular, embodiments of the invention may include a method for providing communication security at a first networking layer, and at a second networking layer different than the first networking layer, for a wireless client comprising a first processor, the method including steps of obtaining a security algorithm from a first controller for use in security processes at a first networking layer, wherein the first controller is associated with the first networking layer, and negotiating with a second controller for use of the security algorithm for use in security processes at a second networking layer, wherein the second controller is associated with the second networking layer, and wherein the security processes in the wireless client at the first networking layer and the second networking layer are performed in the first processor.

Further, the method may include operating at least a portion of the wireless client at a reduced power level during at least a portion of obtaining a security algorithm from a first controller and negotiating with a second controller.

Optionally, the method may apply when the first networking layer is a link-layer and the second networking layer is a network-layer. The second networking layer for instance may be TLS or IPsec.

The method may further operate by obtaining a security algorithm from a first controller by a method that includes requesting the security algorithm for first-layer security by the wireless client from the first controller, and delivering the security algorithm to a TLS stack within the wireless client.

The method may further operate by negotiating with the second controller by a method that includes presenting the security algorithm to the second controller for use by the second controller to provide network-layer security when communicating with the wireless client, receiving a security algorithm confirmation from the second controller, and configuring the wireless client to use the security algorithm for both first-layer and second-layer security processing.

The security algorithm for the method may be, for instance, AES-CCM or AES-GCM.

Delivery of the security algorithm to the TLS stack further may further include placing the security algorithm as a top-priority security algorithm for TLS sessions, or configuring the security algorithm into the TLS stack.

Currently, the TLS protocol does not have an option of including the Advanced Encryption Standard/Cipher Block Chaining-Message Authentication Code (AES-CCM) security algorithm for use in TLS. Generally, a security algorithm herein may be referred to as a cipher. A cipher is one part of a security protocol. Generally, a security protocol includes additional functions such as authentication, key assertion, liveness checks, and related functions. The AES-CCM cipher is widely used in 802.11 and 802.16, but other ciphers such as AES-GCM are also available. Embodiments of the present invention describe additions to the TLS protocol to include layer-2 ciphers (e.g., AES-CCM, AES-GCM, etc.) during cipher negotiation, so that processor implementing IEEE 802.11 and IEEE 802.16 can use their existing layer-2 cryptographic processing engines (e.g., AES-CCM and AES-GCM) to perform TLS security processing. An engine, as referred to herein, is a set of lookup and/or classification logic, implemented in firmware and/or hardware, that detects the protocol type and security type of the packet at each networking layer.

Packets processed for WLAN and TLS security in accord with embodiments of the present invention are processed in a pipelined manner, eliminating the multi-loop processing that currently exists. This has the benefit of decreasing the power consumed to process each packet. Furthermore, while security processing is being performed in the WNIC, other processing portions of the wireless device can be put into a power-saving mode, and then removed from the power-saving mode after the security processing is completed, thus further saving power and extending battery life of the wireless device. Based on basic packet processing analysis, this invention improves battery life when used in small, low-powered devices, e.g., devices based on the MID/UMPC platforms, and/or mobile phones or smart-phones that are capable of providing Internet access via 802.11, 802.16, or other wireless access protocols.

Embodiments of the present invention introduce a change in the TLS protocol having a beneficial impact to the wireless device, by eliminating the need for using multiple engines to process security for different protocol layers. Embodiments of the present invention introduce a single cross-layer security processor. Conventional wireless products do not have a single or unified security processor for all wireless (layer-2), IPsec (layer-3) and TLS (layer-4) security processing.

Embodiments of the present invention provide a pipeline mode, cutting through multiple layers of networking hierarchy, for efficiently processing multiple layers of networking security for an incoming packet. The pipeline mode enables processing the security in a single pass through a security engine in a single processor chip. Embodiments of the present invention add a deep packet lookup engine between the pipelines. As is known by a person of ordinary skill in the art, deep packet ("DP") lookup operates by analyzing the content in both the packet header and the payload over a series of packet transactions. Consequently, DP provides the ability to analyze network usage and optimize network performance, thereby enabling a network operator to manage more effectively the traffic flow through the network.

One embodiment of the present invention adds AES-CCM into the TLS protocol, thereby achieving at least the following benefits:

(1) Because AES-CCM is a more efficient security algorithm, and provides improved processing throughput or processing speed of security packets compared to the security processing performed at Layer-2 by the WNIC, adding AES-CCM cryptographic processing to the TLS protocol will improve overall TLS packet processing latency. Benefits are further achieved because AES-CCM cryptographic processing requires only five block cipher operations per packet, resulting in minimal packet expansion after security encryption processing is done. Encryption and decryption both require one block cipher encryption function. Encryption and authentication can be performed simultaneously by hardware, without waiting for encryption to be completed before performing the authentication check;

(2) Usage of AES-CCM allows combining the AES-CTR mode for data confidentiality and Cipher Block Chaining Message Authentication Code ("CBC-MAC") for integrity and authentication. AES-CTR and CBC-MAC are operating modes that are well known to persons of ordinary skill in the art. Techniques of combining AES-CTR and CBC-MAC are well known to persons of ordinary skill in the art, for instance as described in R. Housley (RSA Laboratories), "Counter with CBC-MAC (CCM) AES Mode of Operation", public submission to NIST;

(3) AES-CCM will be able to perform encryption and a Message Integrity Code (MIC) calculation as part of same algorithm. This eliminates the need to perform separate encryption and separate message authentication, as is currently done in TLS. In contrast, the conventional method of performing encryption using the SHA integrity security algorithms is relatively more computationally expensive than using AES;

(4) To the extent that WNICs may already support AES-CCM processing capability, adding AES-CCM into the TLS protocol standard enables WNIC hardware to be extended, using existing WNIC hardware, to perform TLS security.

Figure 1:
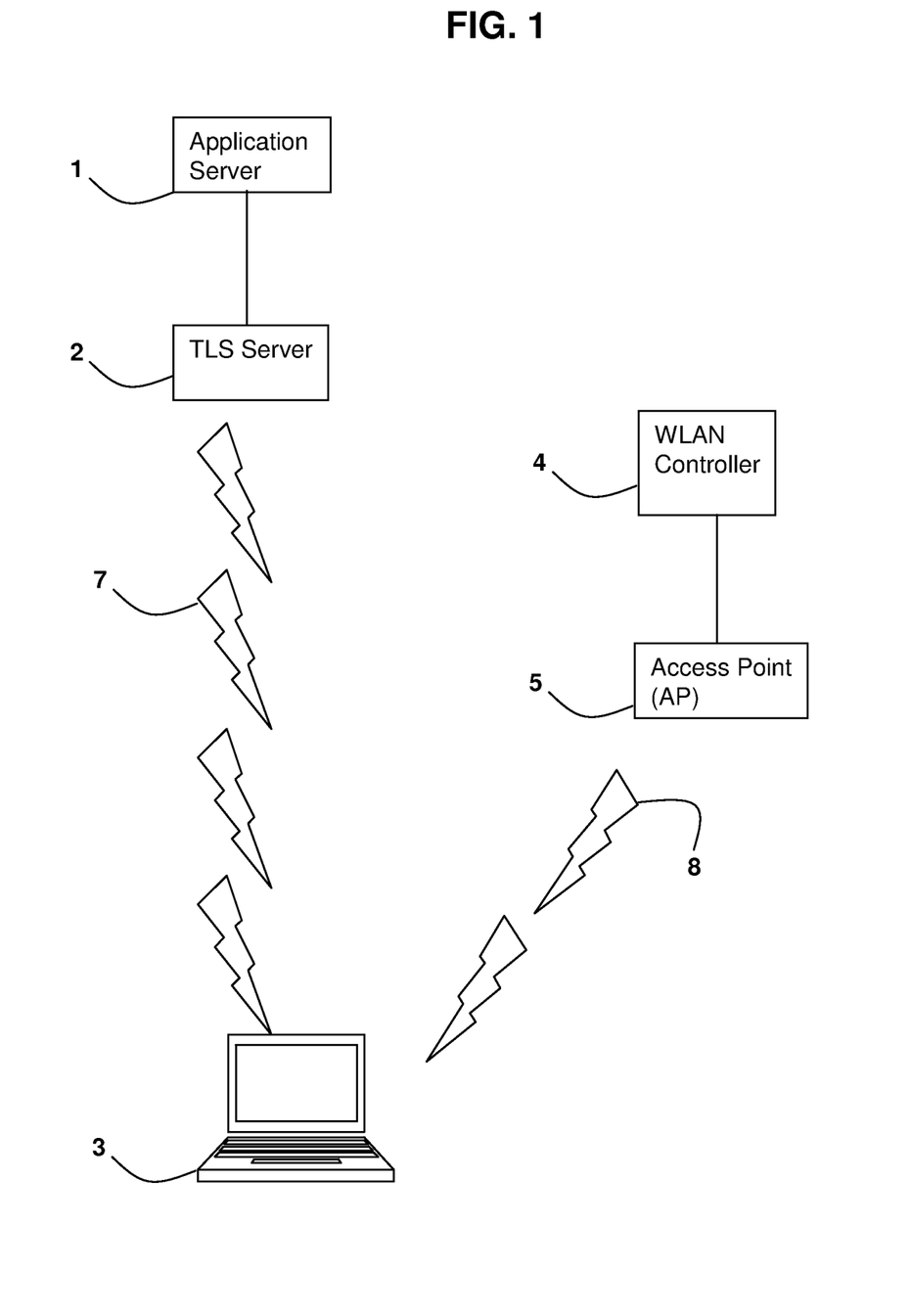
FIG. 1 shows a TLS session negotiating wireless cryptographic ciphers.

Referring to FIG. 1, a first embodiment of the invention is described below, including the protocol components, protocol message flows, and expected behavior. FIG. 1 illustrates an exemplary network level diagram, illustrating the major components in the network when a client initiates a TLS session with any Application Server protected with TLS security, and uses TLS extensions. FIG. 1 illustrates an embodiment of the invention, that of the wireless client 3 negotiating the same cryptographic cipher suites with the remote TLS Server 2, as that used by the wireless layer. A cipher suite, as used herein (unless a different meaning is clearly indicated by the context of usage), refers to a family of related cryptographic algorithms for protecting the message, e.g., AES, DES, etc. The TLS Server 2 is one embodiment of an Application Security Server. A TLS Stack refers to generic software and/or hardware components on a machine that processes TLS protocol packets. Embodiments of the invention may be practiced in networks that rely upon a non-TLS protocol, by use of an Application Security Server directed to the non-TLS protocol.

Referring to FIG. 1, a WLAN controller 4 is in control of wireless access point AP designated as 5. Additional access points (not shown) may also be controlled by WLAN controller 4. WLAN controller 4 and access point 5 will be of compatible technology, e.g., both 802.11 or both 802.16. A wireless client 3 is illustrated as a laptop PC, but may be any communication device with wireless communication capability compatible with IEEE 802.11 and/or 802.16. It will be understood that the embodiments described may also be used with other wireless technology standards. The wireless client 3 is in communication 8 with at least one of the access points, for example AP 5.

The wireless client 3 obtains a cipher from AP 5, e.g., the AES-CCM-128 cipher, for use at the link-layer. However, this embodiment is not limited to this cipher, and applies to all present ciphers and security modes, future ciphers that may be introduced in wireless or TLS suites, and other security modes of AES. A "mode" as used herein (unless a different meaning is clearly indicated by the context of usage) is the use of a cipher for a specific purpose, e.g. using AES for encryption only is one mode; using AES for encryption and authentication is a second mode; etc.

The wireless client 3 implements the TLS protocol, which includes various software components (not shown) such as a client wireless driver, TLS stack (not shown), and software drivers used for inter-processor communications. The TLS stack is a set of protocol processing components within wireless client 3. After wireless client 3 has obtained a link-layer cipher from AP 5, the link-layer driver of wireless client 3 delivers this cipher to the TLS stack of the wireless client 3, and places the cipher as the preferred cipher for TLS sessions. A platform may support multiple layer-2 ciphers, e.g., AES-CCM and AES-GCM; however, it may negotiate only one of the layer-2 ciphers with AP 5. Alternatively, for platforms that support only a single layer-2 cipher, information about the supported layer-2 cipher can be configured into the TLS stack of wireless client 3. Configuring the cipher into the TLS stack equivalently may be referred to as delivering the cipher to the TLS stack.

The wireless client is then able to initiate a TLS session with a remote application server. When the wireless client 3 initiates this session, the wireless client 3 presents the cipher obtained from AP 5, e.g., the AES-CCM-128 cipher, as the cipher for the TLS server 2 to accept.

The TLS server 2 then processes the cipher presented by the wireless client 3, and if the cipher is supported by the TLS server 2, the cipher presented by the wireless client will be accepted as the cipher for transport layer security.

The wireless client 3 and the TLS server 2 then establish application transport layer security using the cipher obtained from AP 5, e.g., the AES-CCM-128 cipher, by initiating the communication link using the cipher.

The wireless client 3 may also use the same security processing engine in their wireless processor to process layer-2 (i.e., networking-layer) and layer-4 (transport layer) security processing security in tandem. Such tandem security processing will be associated with each other because of the cipher, but will not necessarily be performed together in a temporal sense. Optionally, separate security processing engines may be used, for instance in the case of wireless client implemented with a multi-core CPU.

By this first embodiment described above, the wireless client 3 is able to process packets for both wireless security at the transport layer (layer-4) and networking layer (layer-2) without waking the main processor of the wireless client 3 or routing encrypted packet through the main processor.

Figure 2:
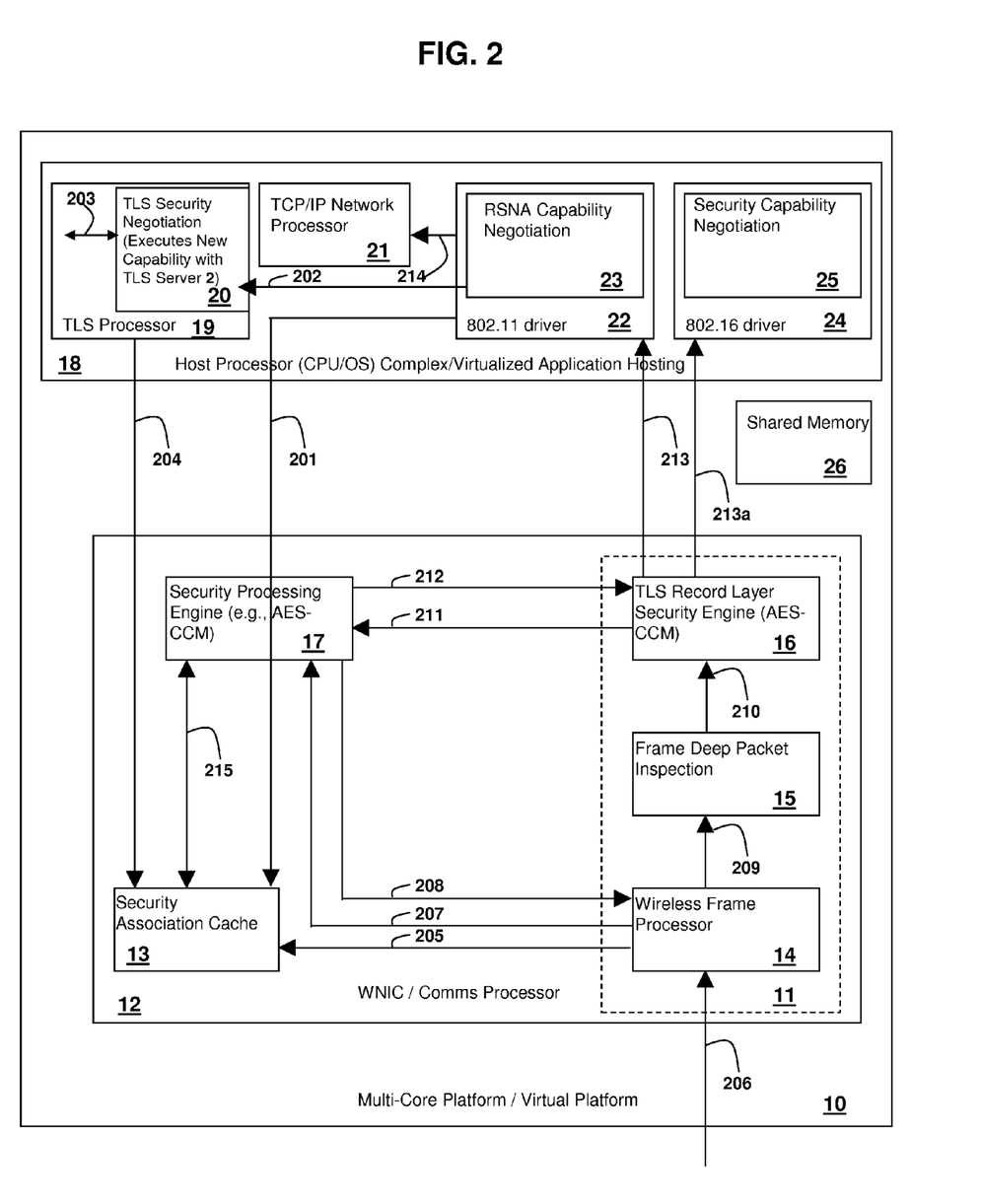
FIG. 2 shows an architecture for efficient security processing packet flow for link-layer wireless and TLS communication.

FIG. 2 illustrates an architecture within the wireless client for efficient security processing packet flow for wireless and TLS processing, according to the method of the first embodiment. The architecture is described in terms of a multi-core platform 10 (i.e., a processor having multiple independent processing cores), because the multi-core platform 10 offers the most flexibility in describing embodiments of the invention. The functions described in this embodiment may interchangeably be executed in various kinds of processors, for instance one of more of virtualization and/or virtual platforms (i.e., a platform with virtualization technology, wherein virtualization is a technology that allows same software to run on different hardware) multi-core processors, system on chip, or a multi-chip solution. The execution is interchangeable in the sense that the application server 1, the TLS server 2, the WLAN controller 4, and/or the wireless client 3 may be implemented with any of these types of processors without affecting the method of the first embodiment of the invention.

An architecture in accord with FIG. 2 features a security processing engine 11 in the Comms processor 12 using a pipeline mode to process packets for different layers of the stack. The Comms processor 12 is a communication engine. The various engines of FIG. 2 may be implemented within any combination of the plurality of cores within a multi-core processor. Pipeline mode refers to a broad functional pipeline of processing steps needed to process a packet. Pipeline mode uses a security pipeline architecture that processes all packets for multiple layer security, each packet being inspected for upper layer presence. Layer-2 and Layer-4 security processing is demonstrated in this embodiment. This also applies to Layer-2 and Layer-3 (i.e., IETF IPsec) security processing. It is known to persons of ordinary skill in the art that adapting the methods disclosed herein to process Layer-2 and Layer-3 communications would include examining the different fields within a packet, and applying different security encapsulation processing suitable for the layers processed. Every security protocol (e.g., layers 2, 3, and 4) has a frame format that typically is different than the frame format used by a different security protocol.

Once the Layer-2 security cipher is established via interface 201, the driver in the wireless client 3 installs the security association, including a cryptographic key and packet counters, into a Security Association Cache 13. The security association is the establishment of shared security information between two network entities to support secure communication.

Next in the present embodiment, the layer-2 wireless driver (e.g., 802.11 driver 22, or 802.16 driver 24) delivers the security algorithm negotiated at layer-2 (e.g. AES-CCM) via interface 202 to the TLS Processor 19. The TLS Processor 19 uses the wireless security algorithms (i.e., layer-2), on packets to or from interface 203, while executing the TLS Security handshake at layer-4.

If the selected cipher assigned by WLAN controller 4 is presented to, and accepted by, the TLS Server 2 then the TLS Processor 19 installs the TLS Security Association into the Security Association Cache 13 via interface 204.

Next, the wireless frame processor 14 installs the Security Associations (e.g. 802.11 Pairwise Transient Key (PTK)) into the Security Association Cache 13 via interface 205, upon conclusion of the wireless security (i.e., layer-2) protocol handshake.

Thereafter, a wireless packet arriving at the comms processor 12 via interface 206 is processed by the wireless frame processor 14, wherein the processing includes at least ensuring that all fields in the wireless frame are consistent with the protocol and sent in the correct order. The processed packet is delivered via interface 207 to the Security Processing Engine 17 (in Comms Processor 12) by the wireless frame processor 14. Associated with this delivery, the Layer-2 wireless Security Association is fetched from the Security Association Cache 13 by the Security Processing Engine 17, via interface 215. The Security Processing Engine 17 decrypts the packet using the Security Association fetched for each packet from the Security Association Cache 13. The wireless frame decrypted in the security processing engine 17 is sent back to the wireless frame processor 14 via interface 208.

After the wireless frame is decrypted, the wireless frame processor 14 processes the frame to ensure compliance with the protocol—e.g. all fields are ordered correctly, that they contain valid values, and, both sides agree on protocol packet processing, etc. The wireless frame processor 14 then sends the decrypted and validated frame to the Deep Packet Inspection Engine 15, via interface 209, for inspecting the packet for the presence of upper protocol headers and identifying TLS (or IPsec) packets.

If packet is a TLS packet, then the packet is sent to a TLS Record Layer Security Processing Engine 16 within Comms Processor 12, via interface 210. If the packet is not a TLS packet, it will be processed by a separate security processing engine (not shown) that is compatible with the packet type.

TLS Record Layer Security Processing Engine 16 will verify that the protocol headers are consistent, prior to sending the packet for decryption.

The packet then is sent via interface 211 to the Security Processing Engine 17, which is the same security processing engine as was used by the Wireless frame security processing. The Security Processing Engine 17 uses the TLS Security Associations from the Security Associations Cache 13. After the packet has been processed for the TLS security, including decrypting the packet and performing a message authentication check, the processed packet is sent back to the TLS Record Layer Security Engine 16 via interface 212.

The entire decrypted wireless frame is passed to the wireless driver, e.g., the 802.11 driver 22, via interface 213. The 802.11 driver 22 performs more frame processing—e.g., by processing any fields that need to be verified. Such field verification may include checking protocol field values, etc., and then passing the frame for upper layer protocol processing. The 802.11 driver 22, wireless client 3 and AP 5 use Robust Security Network Association (RSNA) Capability Negotiation 23 as the mechanism to negotiate security parameters such as ciphers, the type of authentication to use, the type of keys to derive, etc. Other wireless drivers, e.g., the 802.16 driver 24, will also have a security capability negotiation 25 performing similar functions as RSNA Capability Negotiation 23.

The wireless packet then is sent to a TCP/IP Network Processor 21, via interface 214, for upper layer processing. The TLS stack will get this packet and forward it to the upper application (e.g. a browser). The TLS stack of wireless client 3 may be implemented in the TCP/IP Network Processor 21, or it may be implemented in a separate processor.

It will be understood that embodiments described herein may be expanded to include the ciphers used in 802.16 (AES-CCM), 3G, LTE and other wireless technologies in the link used by the TLS Security protocol. For instance, if 802.16 wireless technology is used, then the TLS Record Layer Security Engine 16 will send an entire decrypted frame to the 802.16 driver, via interface 213a. The wireless packet would then be sent to the TCP/IP Network Processor 21 (interface not shown in FIG. 2) for upper layer processing.

Figure 3:
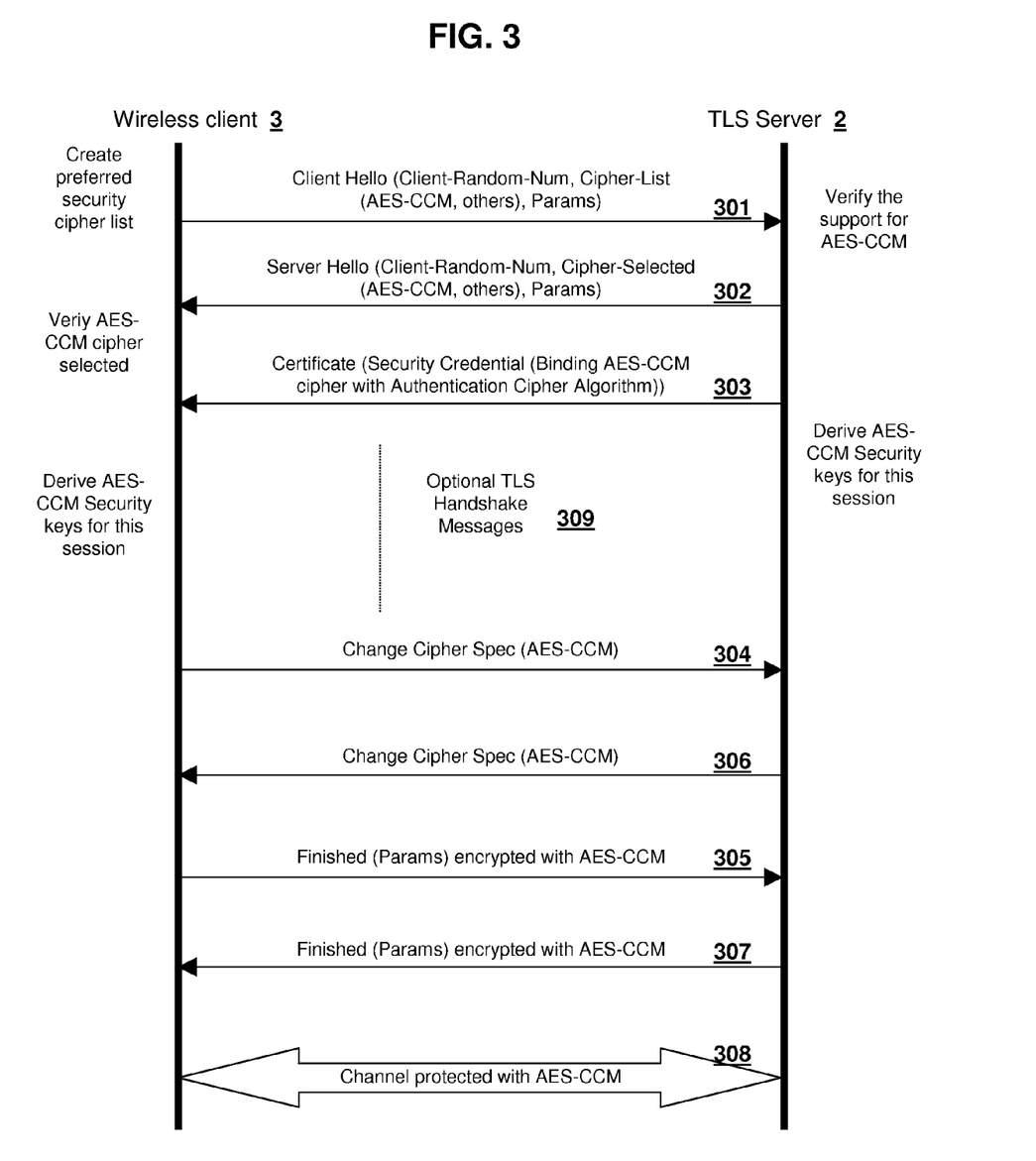
FIG. 3 shows additions to TLS standard protocol flow for negotiating layer-2 wireless security algorithms.

FIG. 3 illustrates the protocol message flows, according to embodiments of the invention. The wireless client 3 and TLS Server 2 negotiate and use the security processing algorithms in the TLS security protocol, which are used for the wireless 802.11/802.16 layer-2 frame processing.

The protocol is described for the TLS protocol, but can be extended to use IETF IPsec and other transport layer security protocols. Ciphers usable with this embodiment include, but are not limited to AES-CCM-128, AES-CCM-192, AES-CCM-256, and any combination of these ciphers with other asymmetric authentication algorithms such as RSA, Diffie-Hellman, DSA, etc. For instance, an AES-CCM cipher may be used for encryption, and one of the other asymmetric authentication algorithms (e.g., RSA, Diffie-Hellman, etc.) used for entity authentication. Encryption, Message Integrity/Authentication, entity authentication, and replay protection are important parts of security. Algorithms that may be chosen are configured by a Security Administrator, depending on their Security Policy.

Referring to FIG. 3, first the WNIC in the wireless client 3 will propagate to the TLS stack in TLS Server 2, via message 301, the wireless cryptographic algorithms negotiated as part of the 802.11 RSNA Security handshake. Typically, the handshake (i.e., "negotiation") includes the receiver and sender sending all their supported security parameters to each other via handshake messages. The sender and receiver then pick the most preferred of all options (as listed in order of priority) and convey that to each other.

The TLS client stack within wireless client 3 will use the layer-2 cipher as the highest priority security option to the TLS server 2, when establishing a communication session via a TLS-Client-Hello message 301 or equivalent. Alternatively, the layer-2 cipher may be the only priority security option available to the TLS server 2, as determined during handshaking.

TLS Server 2 accepts this security cipher option for use in the subsequent TLS Security session. This is done by the TLS Server 2 indicating its consent in the TLS-Server-Hello message 302. After consent, the TLS Server 2 sends its security credentials to the wireless client 3 via message 303, and the wireless client 3 optionally can send its security credentials to the TLS server 2 via messages 309. Exchange of security credentials is accomplished by the Certificate and Server-KeyExchange messages, which are part of the TLS protocol.

The wireless client 3 and TLS Server 2 compute the TLS Session keys for the negotiated cipher (e.g., the AES-CCM-128 algorithm). The wireless client 3 sends the ChangeCipherSpec message 304 to the TLS Server 2 to indicate setting the AES-CCM-128 security associations. The TLS Server 2 responds by sending the ChangeCipherSpec message 306 to the wireless client 3 to indicate setting its corresponding AES-CCM-128 security associations.

The wireless client 3 then sends the TLS-Finished message 305 to the TLS Server 2, which is encrypted with the same cipher suite as the wireless security (e.g., AES-CCM-128). The TLS Server 2 then sends a TLS-Finished message 307 to the wireless client 3 encrypted with the same cipher suite and keys, negotiated with the client (e.g., AES-CCM-128). The ChangeCipherSpec message and TLS-Finished message are known as part of the TLS protocol. After the same ciphers are set in the wireless client 3 and the TLS Server 2, messages 308 protected by the cipher may be exchanged.

Figure 4:
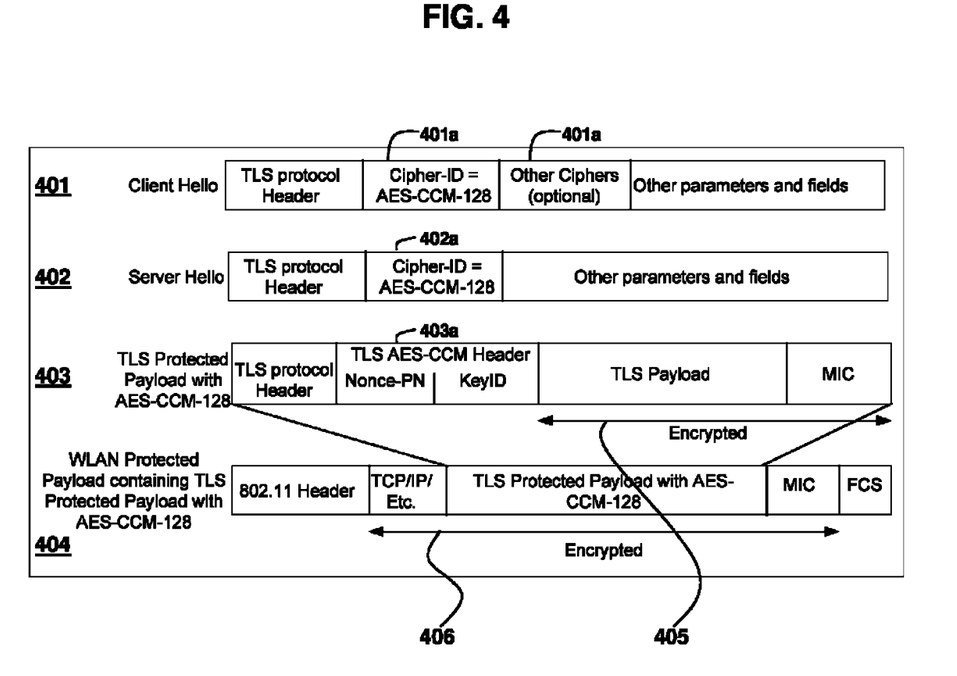
FIG. 4 shows a TLS protocol message formats, modified to support embodiments of the present invention.

FIG. 4 illustrates the new TLS message formats used to implement embodiments of the invention. The illustrated messages include new or modified fields that would be added to the TLS protocol standard.

Client Hello message 401 has been modified by way of inserting one or more fields 401a that indicate the security algorithms that were negotiated by the wireless link layer protocol.

Server Hello message 402 has been modified by way of inserting field 402a, which indicates the security algorithms that are proposed by the wireless client 3 in order of priority, if configured per the security policy of TLS Server 2.

TLS Protected Payload message 403 has been modified by way of inserting field 403a, which indicates the AES-CCM security protocol parameters like the packet number, Nonce value and Key Identifier. A new packet number is used for each new packet, and a new Nonce value has to be computed for each packet.

TLS Protected Payload message 403 forms part of the WLAN Protected Payload message 404. No new modification is needed for WLAN Protected payload message 404 besides normal layer-2 (e.g., 802.11) security processing with the specific cipher selected (e.g., AES-CCM). If other ciphers are used, for instance AES-GCM, then message 404 needs to be secured using the AES-GCM cipher.

FIG. 4 also shows the encrypted and integrity protected payload 405 within the TLS Protected Payload message 403 for TLS protocol security and the encrypted and integrity protected payload 406 within the WLAN Protected Payload message 404 for layer-2 (e.g., 802.11) security. Integrity protection is implemented in the Message Integrity Code (MIC) field. FIG. 4 also shows fields containing an identifier (e.g., the Cipher-ID) of the AES-CCM security algorithm to be used during negotiation in Client Hello and Server Hello messages, and the AES-CCM parameters to be delivered in the data payload.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim 1ncludes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the re recitation of "two recitations," without other modifiers, typically means at least two recitations, or two or more recitations). Furthermore, in those instances where a convention analogous to "at least one of A, B and C," etc. is used, in general such a construction is intended in the sense one having skill in the art would understand the convention (e.g., "a system having at least one of A, B and C" would include but not be limited to systems that have A alone, B alone, C alone, A and B together, A and C together, B and C together, and/or A, B and C together, etc.). In those instances where a convention analogous to "at least one of A, B or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references, including but not limited to patents, patent applications, and non-patent literature are hereby incorporated by reference herein in their entirety.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

This application may disclose several numerical range limitations that support any range within the disclosed numerical ranges even though a precise range limitation is not stated verbatim in the specification because the embodiments of the invention could be practiced throughout the disclosed numerical ranges. Finally, the entire disclosure of the patents and publications referred in this application, if any, are hereby incorporated herein in entirety by reference.

The invention claimed is:

1. A method for providing communication security at a first networking layer, and at a second networking layer different than the first networking layer, for a wireless client comprising a first processor, the method comprising:
    obtaining a security algorithm by the wireless client from a first controller for use in security processes at a first networking layer, wherein the first controller is associated with the first networking layer;
    delivering, at the wireless client, the obtained security algorithm to be used with the security processes at the first networking layer to a component of a Transport Layer Security (TLS) protocol stack of the wireless client which implements a security protocol of a second networking layer; and
    negotiating, by the wireless client, with a second controller for use of the obtained security algorithm configured into the component of the wireless client in security processes at the second networking layer, wherein upon negotiation, the obtained security algorithm is added to the security protocol of the second networking layer, wherein the second controller is associated with the second networking layer,
    wherein the security processes at the first networking layer and the security processes at the second networking layer are performed in the first processor.

2. The method of claim 1, further comprising:
    operating at least a portion of the wireless client at a reduced power level during at least a portion of obtaining a security algorithm from a first controller and negotiating with a second controller.

3. The method of claim 1, wherein the first networking layer is a link-layer and the second networking layer is a network-layer.

4. The method of claim 1, wherein the second networking layer comprises one selected from the group consisting of TLS and IPsec.

5. The method of claim 1, wherein obtaining a security algorithm from a first controller comprises: requesting the security algorithm for first-layer security by the wireless client from the first controller.

6. The method of claim 1, wherein negotiating with the second controller comprises:
    presenting the security algorithm to the second controller for use by the second controller to provide network-layer security when communicating with the wireless client;
    receiving a security algorithm confirmation from the second controller; and
    configuring the wireless client to use the security algorithm for both first-layer and second-layer security processing.

7. The method of claim 1, wherein the security algorithm is selected from a group consisting of AES-CCM and AES-GCM.

8. The method of claim 1, wherein delivering the security algorithm to the TLS stack further comprises placing the security algorithm as a top-priority security algorithm for TLS sessions.

9. The method of claim 1, wherein delivering the security algorithm to the TLS stack further comprises configuring the security algorithm into the TLS stack.

10. A method for processing packets for a first networking layer and a second networking layer of a networking stack, by use of a processor of a wireless client, wherein the first networking layer is different than the second networking layer, the method comprising:
    obtaining a security algorithm from a first controller for use in security processes at a first networking layer, wherein the first controller is associated with the first networking layer;
    installing a security association into a security association cache of the wireless client, wherein the security association comprises security information of the security algorithm;
    delivering the obtained security algorithm to be used with the security processes at the first networking layer to a component of a Transport Layer Security (TLS) protocol stack of the wireless client which implements a security protocol of the second networking layer;
    negotiating with a second controller for use of the obtained security algorithm configured into the component of the wireless client in security processes at the second networking layer, wherein upon negotiation, the obtained security algorithm is added to the security protocol of the second networking layer, wherein the second controller is associated with the second networking layer;

processing a received wireless packet at a first networking layer using the security association, by the wireless-device processor, producing a first networking processed packet associated with the received wireless packet;

processing the first networking processed packet associated with the received wireless packet at a second networking layer using the security association used to process the received wireless packet at the first networking layer, by the wireless-device processor, producing a second networking processed packet associated with the received wireless packet; and providing the second networking processed packet to a networking application.

11. The method of claim 10, further comprising:
operating at least a portion of the wireless client at a reduced power level during predetermined processing steps.

12. The method of claim 10, wherein the first networking layer is a link-layer and the second networking layer is a network-layer.

13. The method of claim 10, wherein the step of processing the received wireless packet at the first networking layer further comprises:
processing the received wireless packet by a first networking layer frame processor, producing a frame-processed packet;
delivering the frame-processed packet to a comms security processing engine, wherein the comms security processing engine produces a first networking layer decrypted frame by use of the first networking layer security association;
providing the first networking layer decrypted frame to a first networking layer frame processor, producing a frame-processed frame; and
providing the frame-processed frame to a deep packet inspection engine, to inspect for an upper protocol header or an identification of upper-level packets.

14. The method of claim 10, wherein the step of processing the first-processed packet at a second networking layer further comprises:
providing the first-processed packet to a second-networking-layer security engine, producing a second-networking-layer processed packet;
providing the TLS-networking-layer processed packet to a comms security processing engine, wherein the comms security processing engine produces a second-layer decrypted frame by use of the second-layer security association; and
providing the second-layer decrypted frame to a first networking layer wireless driver.

15. A method for using a security protocol, of a network communication protocol, to provide security at a first layer and a second layer, the method comprising:
requesting a security algorithm for first-layer security by a wireless client from a network access point;
receiving an assigned first-layer security algorithm from the network access point;
storing onto a Transport Layer Security (TLS) protocol stack the assigned first-layer security algorithm, wherein the TLS protocol stack includes a component of the wireless client which implements a second-layer security protocol associated with the second layer;
negotiating, with a controller, for use of the assigned first-layer security algorithm in a security process of the second-layer security protocol, wherein the controller is associated with the second layer; and
responsive to said negotiating, modifying the second-layer security protocol to use the assigned first-layer security algorithm stored onto the TLS protocol stack.

16. The method of claim 15, wherein the network communication protocol comprises one selected from the group consisting of TLS and IPsec.

17. The method of claim 15, wherein the security algorithm is a type selected from a group consisting of AES-CCM and AES-GCM.

18. The method of claim 17, wherein the security algorithm is combined with an asymmetric authentication algorithm.

19. The method of claim 15, wherein the step of configuring a second-layer communication further comprises:
transmitting a TLS-Client-Hello message by use of the second-layer security algorithm as a highest priority security option;
receiving a TLS-Server-Hello message from a TLS Server, wherein the TLS-Server-Hello message indicates TLS Server acceptance of the second-layer security algorithm for use in a subsequent TLS Security session;
receiving security credentials from the TLS Server by use of a Certificate message and a ServerKeyExchange message;
transmitting security credentials of the wireless client to the TLS Server by use of a Certificate message and a ServerKeyExchange message;
computing a TLS Session key for use in the first-layer security algorithm; and
adapting the wireless client and the TLS server to use the first-layer security algorithm.

20. A wireless client adapted for providing communication security at a first networking layer, and at a second networking layer different than the first networking layer, the wireless client comprising:
a first interface adapted to obtain a security algorithm from a first controller for use in security processes at a first networking layer, wherein the first controller is associated with the first networking layer;
a protocol-processing component of a Transport Layer Security (TLS) protocol stack configured to store the obtained security algorithm to be used with the security processes at the first networking layer, and implement a security protocol of a second networking layer;
a second interface adapted to negotiate with a second controller for use of the obtained security algorithm configured into the protocol-processing component in security processes at the second networking layer, wherein upon negotiation, the obtained security algorithm is added to the security protocol of the second networking layer, wherein the second controller is associated with the second networking layer; and
a processor configured to perform the security processes at the first networking layer and the security processes at the second networking layer.

21. The wireless client of claim 20, wherein at least a portion of the wireless client operates at a reduced power level while performing at least a portion of the security processes.

22. A method for providing communication security at a first networking layer, and at a second networking layer different than the first networking layer, for a wireless client comprising a processor, the method comprising:
obtaining a security algorithm by the wireless client from a first controller for use in a first security process at a first networking layer, wherein the first controller is associated with the first networking layer;
delivering, at the wireless client, the obtained security algorithm to be used with the first security process at the first networking layer into a component of a Transport Layer Security (TLS) protocol stack of the wireless client which implements a security protocol of a second networking layer;

negotiating, by the wireless client, with a second controller for use of the obtained security algorithm configured into the component of the wireless client in a second security process at the second networking layer, wherein upon negotiation, the obtained security algorithm is added to the security protocol of the second networking layer, wherein the second controller is associated with the second networking layer; and performing, using the processor, the first security process at the first networking layer and the second security process at the second networking layer using the security algorithm for a same data packet received by the wireless client.

23. A wireless client adapted for providing communication security at a first networking layer, and at a second networking layer different than the first networking layer, the wireless client comprising:

a first interface adapted to obtain a security algorithm from a first controller for use in a first security process at a first networking layer, wherein the first controller is associated with the first networking layer;

a protocol-processing component of a Transport Layer Security (TLS) protocol stack configured to store the obtained security algorithm to be used with the first security process at the first networking layer, and implement a security protocol of a second networking layer;

a second interface adapted to negotiate with a second controller for use of the obtained security algorithm configured into the protocol-processing component in a second security process at the second networking layer, wherein upon negotiation, the obtained security algorithm is added to the security protocol of the second networking layer, wherein the second controller is associated with the second networking layer; and a processor configured to perform the first security process at the first networking layer and the second security process at the second networking layer using the security algorithm for a same data packet received by the wireless client.

\* \* \* \* \*